(12) United States Patent
Sakakima

(10) Patent No.: US 12,317,003 B2
(45) Date of Patent: May 27, 2025

(54) IMAGING CONTROL APPARATUS, SERVER APPARATUS, IMAGING CONTROL METHOD, AND NON-TRANSITORY COMPUTER-READABLE STORAGE MEDIUM

(71) Applicant: CANON KABUSHIKI KAISHA, Tokyo (JP)

(72) Inventor: Eito Sakakima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 17/735,402

(22) Filed: May 3, 2022

(65) Prior Publication Data
US 2022/0360746 A1 Nov. 10, 2022

(30) Foreign Application Priority Data
May 6, 2021 (JP) ................. 2021-078787

(51) Int. Cl.
 *H04N 7/18* (2006.01)
 *G06T 7/70* (2017.01)
(52) U.S. Cl.
 CPC ........... *H04N 7/183* (2013.01); *G06T 7/70* (2017.01); *G06T 2207/20081* (2013.01)
(58) Field of Classification Search
 CPC .................................. H04N 7/183; G06T 7/70
 USPC ........................................................ 348/169
 See application file for complete search history.

(56) References Cited

U.S. PATENT DOCUMENTS

| | | | | |
|---|---|---|---|---|
| 2006/0192887 A1* | 8/2006 | Miyamaki | .............. | H04N 23/66 348/347 |
| 2012/0148105 A1* | 6/2012 | Burry | ................... | G08G 1/0175 382/105 |
| 2013/0208113 A1* | 8/2013 | Yoneji | .............. | G08B 13/19608 348/143 |

(Continued)

FOREIGN PATENT DOCUMENTS

| CN | 103329518 A | 9/2013 |
|---|---|---|
| CN | 111432114 A | 7/2020 |

(Continued)

OTHER PUBLICATIONS

Partial European Search Report issued on Oct. 7, 2022, which is enclosed, that issued in the corresponding European Patent Application No. 22170466.1.

(Continued)

*Primary Examiner* — Amir Shahnami
(74) *Attorney, Agent, or Firm* — Cowan, Liebowitz & Latman, P.C.

(57) ABSTRACT

There is provided with an imaging control apparatus. An obtaining unit obtains capturing information that defines a target position of a subject, that is an imaging target, in an image to be captured by an imaging unit. A detecting unit detects the subject that is the imaging target from an image captured by the imaging unit. An evaluating unit derives an evaluation pertaining to the imaging of the imaging target for the image, based on a position of the subject that is the imaging target detected by the detecting unit and the target position. A transmitting unit transmits data including the image and a result of the evaluation derived by the evaluating unit for the image.

9 Claims, 15 Drawing Sheets

(56) References Cited

U.S. PATENT DOCUMENTS

| | | | |
|---|---|---|---|
| 2015/0062343 A1* | 3/2015 | Hwang | G08B 13/19647 348/148 |
| 2017/0091552 A1 | 3/2017 | Momoki | |
| 2019/0130627 A1 | 5/2019 | Koizumi | |

FOREIGN PATENT DOCUMENTS

| CN | 112154653 A | 12/2020 |
|---|---|---|
| JP | 2007-049229 A | 2/2007 |
| JP | 2007-228224 A | 9/2007 |
| JP | 2009055448 A | 3/2009 |
| JP | 2009272740 | 11/2009 |
| JP | 2010062912 A | 3/2010 |
| JP | 2011-135527 A | 7/2011 |
| JP | 2011-211598 A | 10/2011 |
| JP | 4864502 B2 | 2/2012 |
| JP | 2016058024 A | 4/2016 |
| JP | 2016-192593 A | 11/2016 |
| JP | 2016225702 A | 12/2016 |
| JP | 2018084861 A | 5/2018 |
| JP | 2019-121855 A | 7/2019 |
| JP | 2020154694 A | 9/2020 |
| WO | 2012096166 A | 7/2012 |
| WO | 2016199483 A | 12/2016 |
| WO | 2019/215797 A1 | 11/2019 |

OTHER PUBLICATIONS

European Search Report issued on Apr. 4, 2023, which is enclosed, that issued in the corresponding European Patent Application No. 22170466.1.

European Search Report issued on Jan. 7, 2025, which is enclosed, that issued in the corresponding European Patent Application No. 22170466.1.

The Oct. 25, 2024 Chinese Office Action, which is enclosed without an English Translation, that issued in Chinese Patent Application No. 202210470311.9.

The above patent documents were cited in the Feb. 21, 2025 Japanese Office Action, a copy of which is enclosed without an English Translation, that issued in Japanese Patent Application No. 2021-078787.

* cited by examiner

EVALUATION VALUE: LOW

EVALUATION VALUE: MEDIUM

EVALUATION VALUE: HIGH

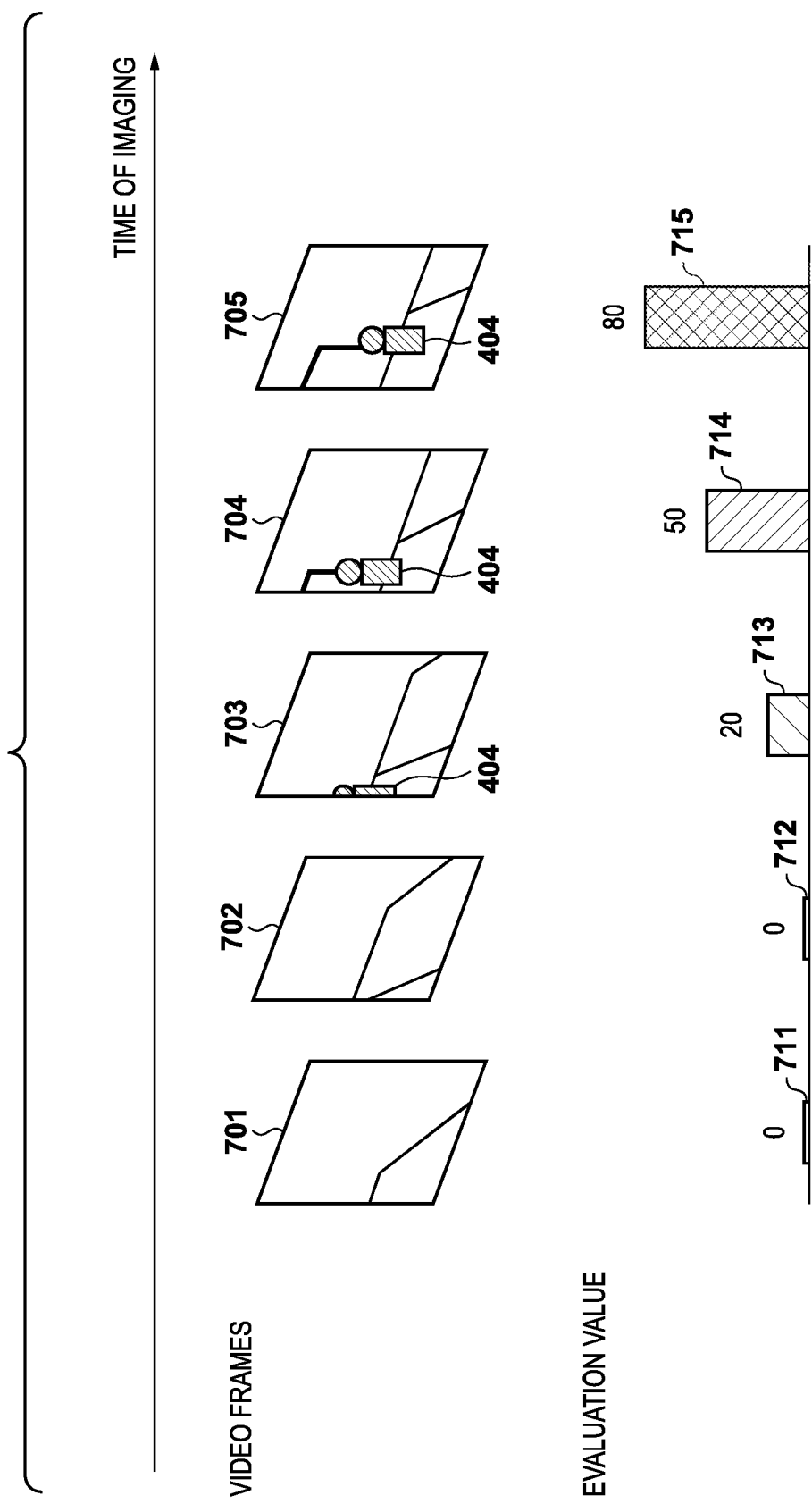

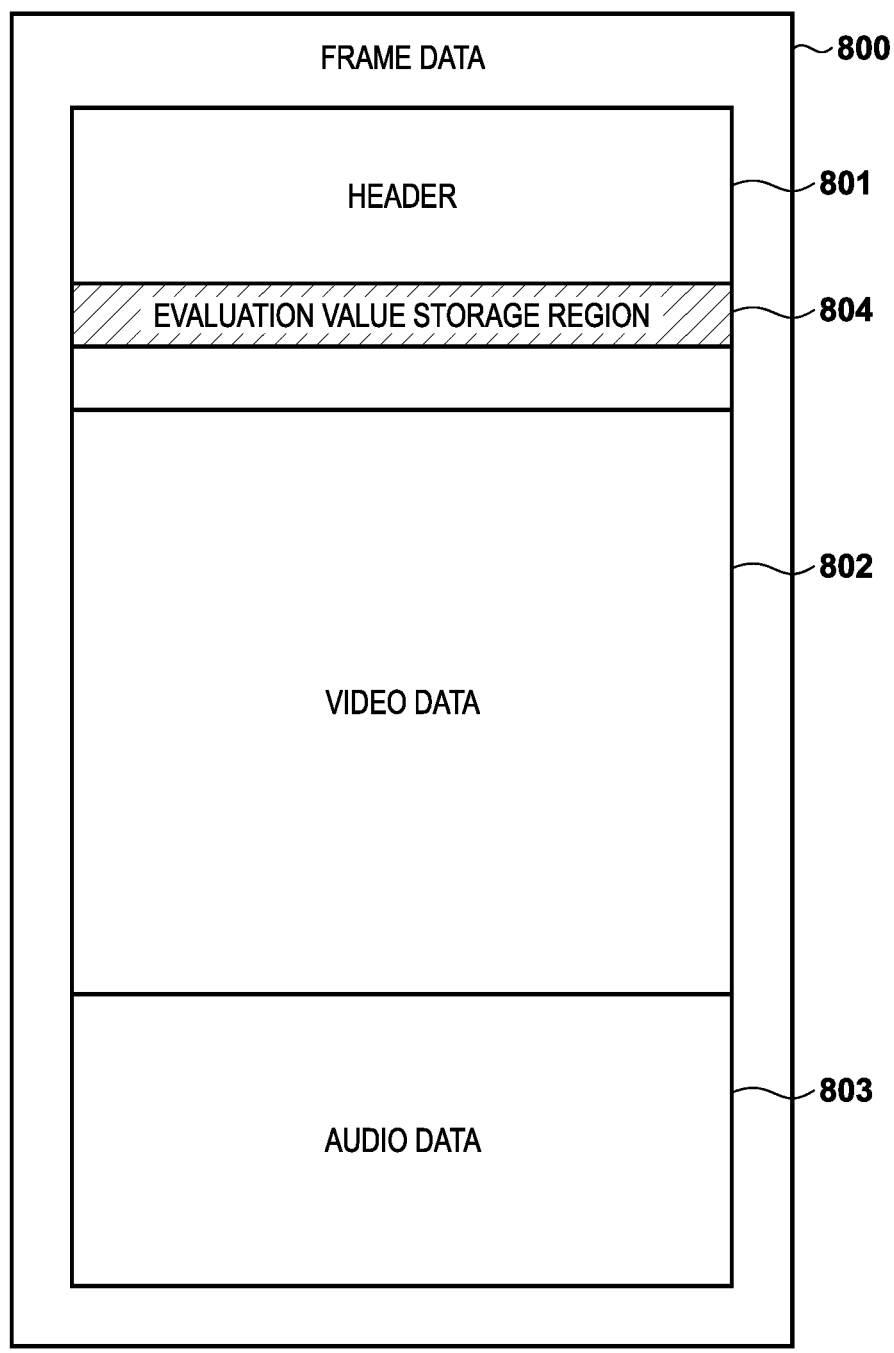

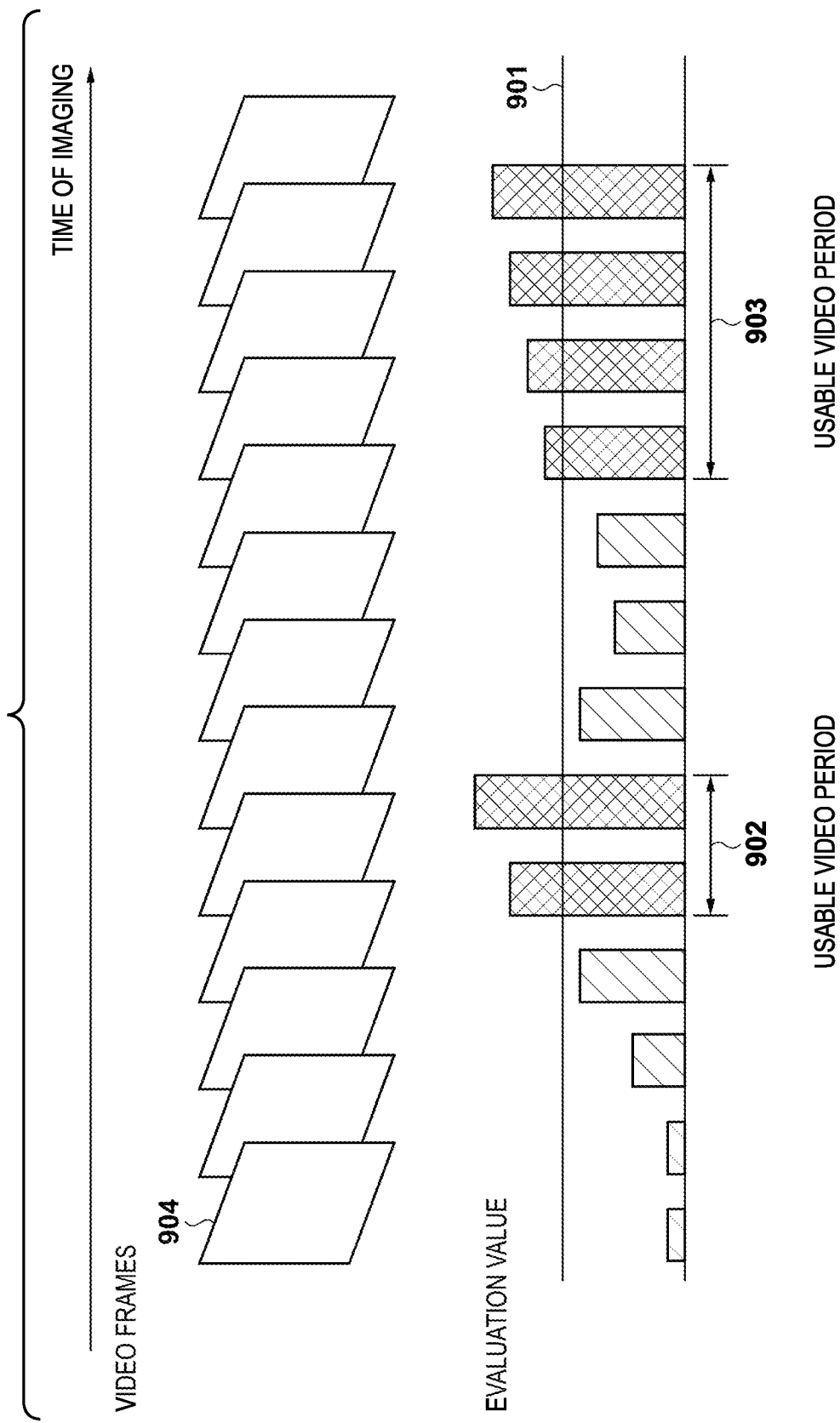

DESCRIPTION OF SCENE

EVALUATION VALUE: LOW

EVALUATION VALUE: MEDIUM

EVALUATION VALUE: HIGH

FIG. 16
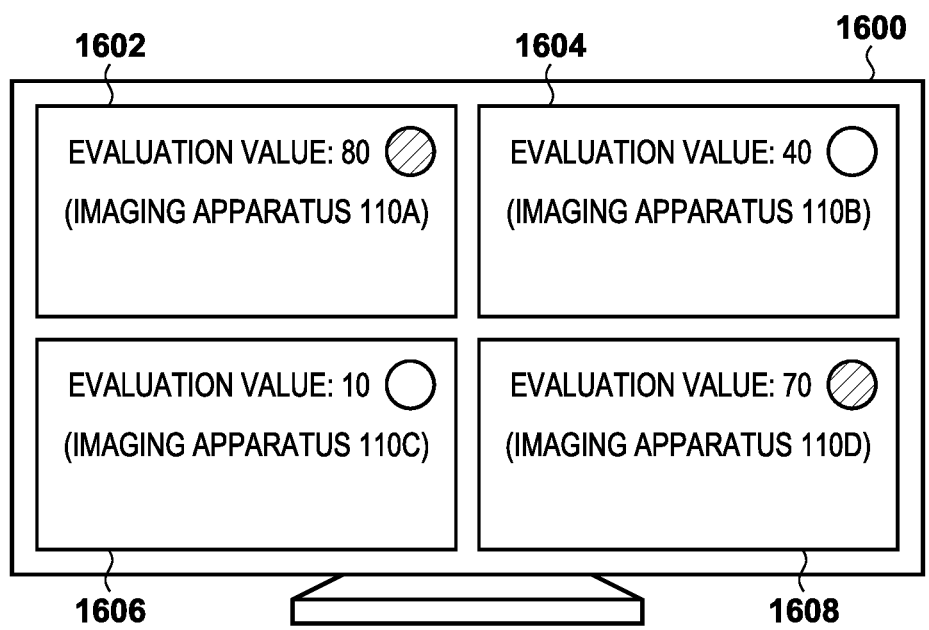
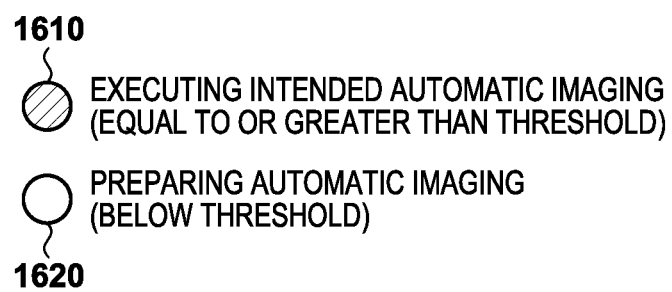

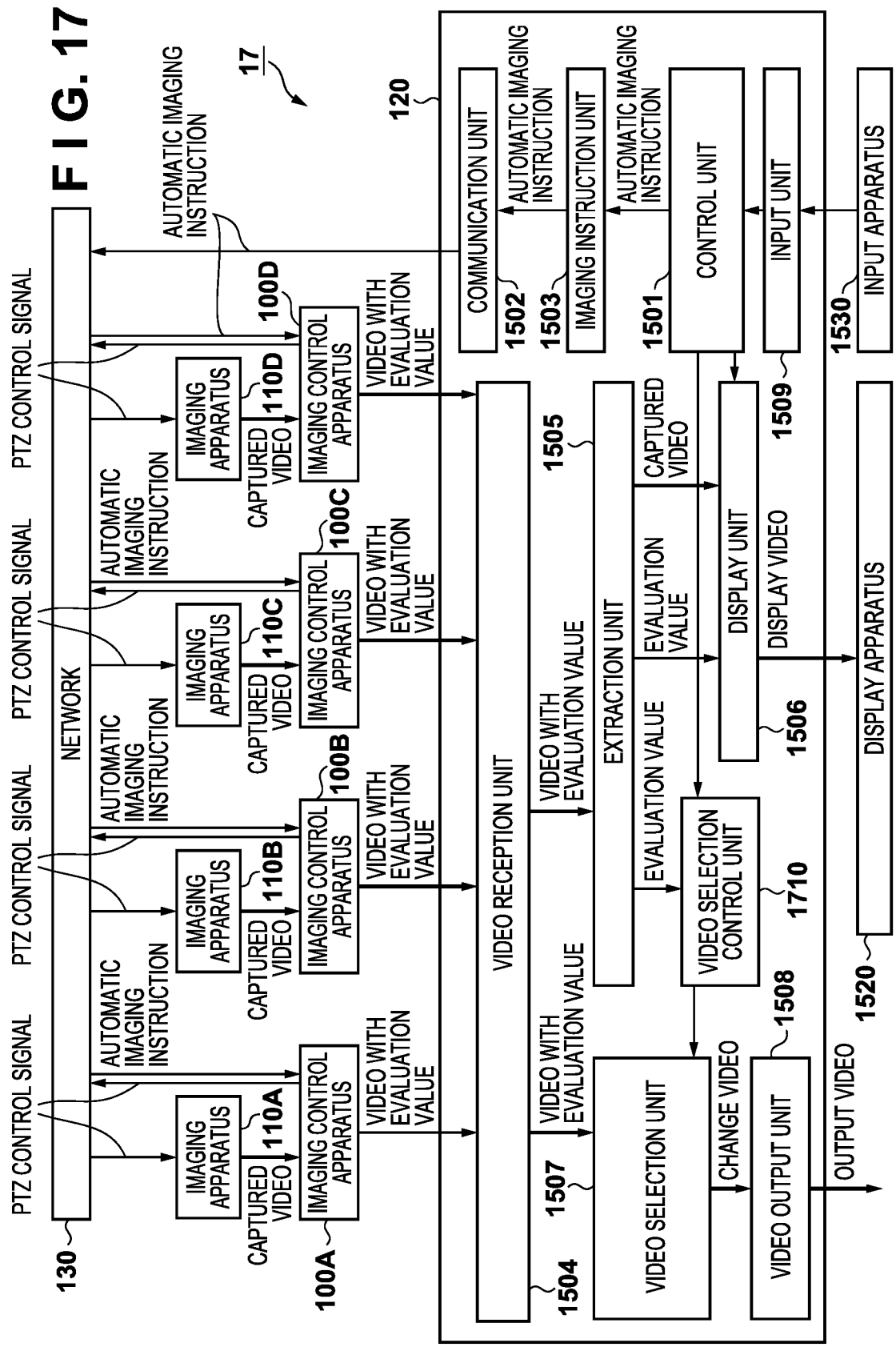

IMAGING CONTROL APPARATUS, SERVER APPARATUS, IMAGING CONTROL METHOD, AND NON-TRANSITORY COMPUTER-READABLE STORAGE MEDIUM

BACKGROUND OF THE INVENTION

Field of the Invention

The present invention relates to an imaging control apparatus, a server apparatus, an imaging control method, and a non-transitory computer-readable storage medium.

Description of the Related Art

Recently, there has been increasing attention on recording of videos of lectures, sports, and the like by automatic imaging in view of cost reduction. In automatic imaging, a target subject of interest, for example, is detected, and a camera's pan, tilt, and zoom (hereinafter, PTZ) are controlled such that the detected subject is always contained in the video. It is anticipated that in the future, in automatic imaging, a network model obtained by machine learning will realize imaging with a desirable composition, rather than just simple automatic imaging in which imaging is performed while tracking a detected subject. However, unlike imaging that is performed while being visually confirmed by a cameraman, it cannot be easily ascertained what kind of video is being captured in videos or moving images captured by automatic imaging. For example, when performing automatic imaging while tracking a subject to be captured, it was necessary to visually observe the captured video in order to confirm whether the subject is contained in the video. The user recognizes whether or not a video contains a subject from the presentation to the user of a state of the subject to be tracked by a method other than video (Japanese Patent Laid-Open No. 2007-49229).

SUMMARY OF THE INVENTION

The present invention in its one aspect provides an imaging control apparatus comprising an obtaining unit configured to obtain capturing information that defines a target position of a subject, that is an imaging target, in an image to be captured by an imaging unit, a detecting unit configured to detect the subject that is the imaging target from an image captured by the imaging unit, an evaluating unit configured to derive an evaluation pertaining to the imaging of the imaging target for the image, based on a position of the subject that is the imaging target detected by the detecting unit and the target position, and a transmitting unit configured to transmit data including the image and a result of the evaluation derived by the evaluating unit for the image.

The present invention in its one aspect provides an imaging control apparatus comprising an obtaining unit configured to obtain an image captured by an imaging unit, an evaluating unit configured to derive an evaluation pertaining to imaging of an image target in the image captured by the imaging unit, using a learned model generated by learning in which supervisory data including information of a target position of a subject that is the image target in an image has been used, and a transmitting unit configured to transmit data including the image captured by the imaging unit and a result of the evaluation derived by the evaluating unit for the image and the image.

The present invention in its one aspect provides a server apparatus comprising an obtaining unit configured to obtain an image captured by an imaging apparatus and an evaluation pertaining to imaging of an imaging target derived for the image, and a processing unit configured to execute predetermined processing based on the evaluation obtained by the obtaining unit, wherein the obtaining unit obtains an evaluation derived for an image obtained from each of a plurality of imaging apparatuses, and the processing unit, as the predetermined processing, (i) causes a display unit to display information of the evaluation derived for respective images of the plurality of imaging apparatuses or (ii) selects an image to be distributed from among a plurality of images captured by the plurality of imaging apparatuses based on the evaluation derived for the respective images of the plurality of imaging apparatuses.

The present invention in its one aspect provides an imaging control method comprising obtaining capturing information that defines a target position of a subject that is an imaging target in an image to be captured by an imaging apparatus, detecting the subject that is the imaging target from an image captured by the imaging apparatus, deriving an evaluation pertaining to the imaging of the imaging target for the image based on a position of the subject that is the imaging target detected by the detecting and the target position, and transmitting data including the image and a result of the evaluation derived by the evaluating for the image.

The present invention in its one aspect provides an imaging control method comprising obtaining an image captured by an imaging apparatus, deriving an evaluation pertaining to imaging of an image target in the image captured by the imaging apparatus using a learned model generated by learning in which supervisory data including information of a target position of a subject that is the image target in an image has been used, and transmitting data including the image captured by the imaging unit and a result of the evaluation derived by the evaluating for the image.

The present invention in its one aspect provides an imaging control method comprising obtaining an image captured by an imaging apparatus and an evaluation pertaining to imaging of an imaging target derived for the image, and executing predetermined processing based on the evaluation obtained by the obtaining, wherein obtaining an evaluation derived for an image obtained from each of a plurality of imaging apparatuses, and processing, as the predetermined processing, (i) causes a display apparatus to display information of the evaluation derived for respective images of the plurality of imaging apparatuses or (ii) selects an image to be distributed from among a plurality of images captured by the plurality of imaging apparatuses based on the evaluation derived for the respective images of the plurality of imaging apparatuses.

The present invention in its one aspect provides a non-transitory computer-readable storage medium storing a program that, when executed by a computer, causes the computer to perform an imaging control method comprising obtaining capturing information that defines a target position of a subject that is an imaging target in an image to be captured by an imaging apparatus, detecting the subject that is the imaging target from an image captured by the imaging apparatus, deriving an evaluation pertaining to the imaging of the imaging target for the image based on a position of the subject that is the imaging target detected by the detecting and the target position, and transmitting data including the image and a result of the evaluation derived by the evaluating for the image.

The present invention in its one aspect provides a non-transitory computer-readable storage medium storing a program that, when executed by a computer, causes the computer to perform an imaging control method comprising obtaining an image captured by an imaging apparatus, deriving an evaluation pertaining to imaging of an image target in the image captured by the imaging apparatus using a learned model generated by learning in which supervisory data including information of a target position of a subject that is the image target in an image has been used, and transmitting data including the image captured by the imaging apparatus and a result of the evaluation derived by the evaluating for the image.

The present invention in its one aspect provides a non-transitory computer-readable storage medium storing a program that, when executed by a computer, causes the computer to perform an imaging control method comprising obtaining an image captured by an imaging apparatus and an evaluation pertaining to imaging of an imaging target derived for the image, and executing predetermined processing based on the evaluation obtained by the obtaining, wherein obtaining an evaluation derived for an image obtained from each of a plurality of imaging apparatuses, and processing, as the predetermined processing, (i) causes a display apparatus to display information of the evaluation derived for respective images of the plurality of imaging apparatuses or (ii) selects an image to be distributed from among a plurality of images captured by the plurality of imaging apparatuses based on the evaluation derived for the respective images of the plurality of imaging apparatuses.

Further features of the present invention will become apparent from the following description of exemplary embodiments (with reference to the attached drawings).

BRIEF DESCRIPTION OF THE DRAWINGS

FIG. 7 is a diagram illustrating the correspondence between a video and evaluation values according to the present embodiment.

FIG. 8 is a diagram for explaining a data format for when sending an evaluation value in association with a video according to the present embodiment.

FIG. 9 is a diagram for explaining an effect of the invention according to the first embodiment.

FIG. 16 is a diagram for explaining an example of simultaneously displaying a plurality of videos and evaluation values according to the third embodiment.

FIG. 17 is a functional block diagram of the automatic imaging system according to a fourth embodiment.

DESCRIPTION OF THE EMBODIMENTS

Figure 1:
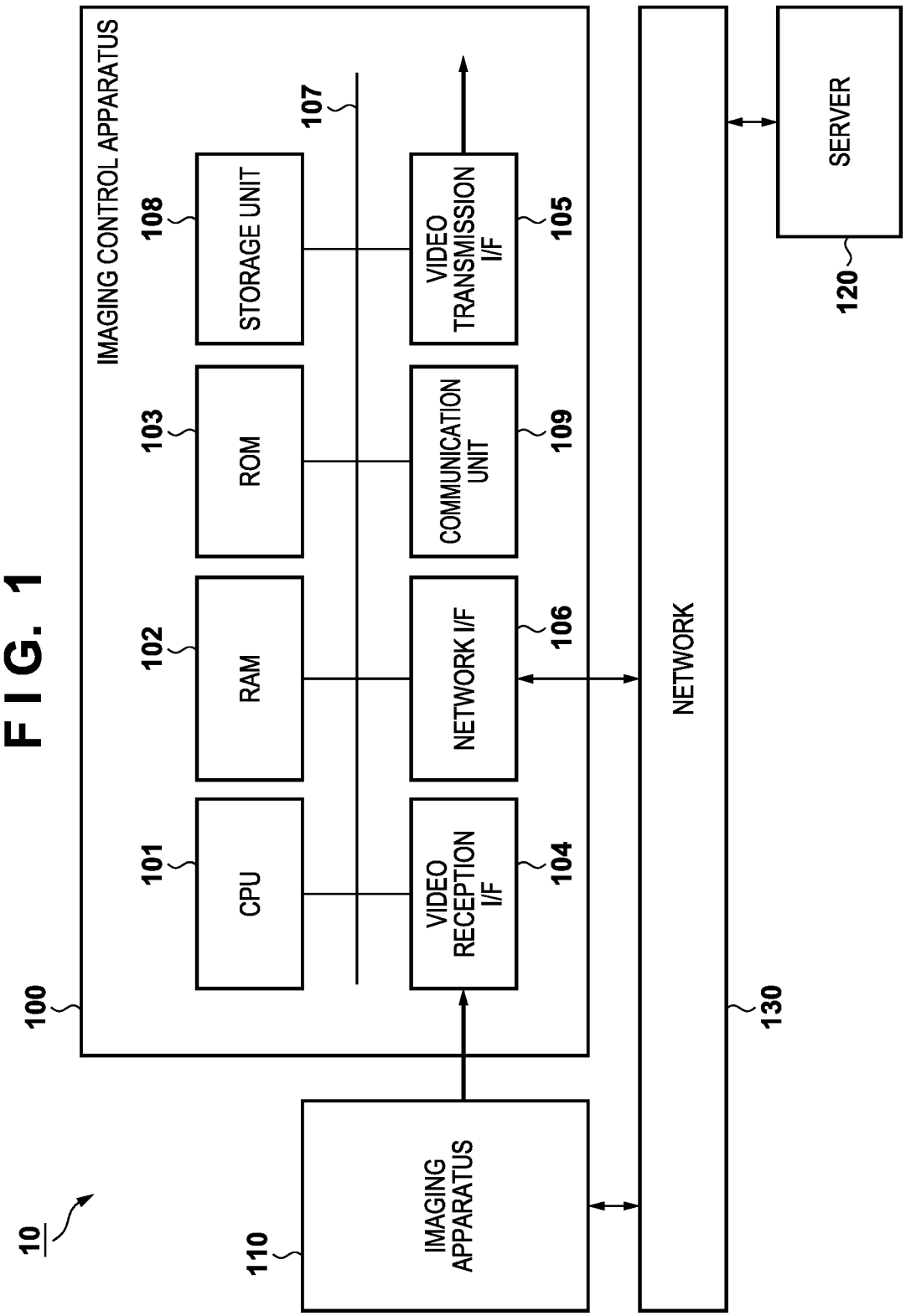
FIG. 1 is a diagram illustrating a configuration of an imaging system according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

In a first embodiment, an example in which an imaging control apparatus 100 performs automatic imaging by controlling PTZ of an imaging apparatus 110 will be described. The automatic imaging of the first embodiment continues to track a designated subject. Hereinafter, an imaging system 10 according to the present embodiment will be described.

FIG. 1 shows an example of the configuration of the imaging system 10 of the present embodiment. In FIG. 1, the imaging system 10 includes the imaging control apparatus 100, the imaging apparatus 110, a server 120, and a network 130. The imaging control apparatus 100 includes a CPU 101, RAM 102, ROM 103, a video reception I/F 104, a video transmission I/F 105, a network I/F 106, a bus 107, a storage unit 108, and a communication unit 109. The imaging control apparatus 100 is a housing and may be, for example, a PC or the like. Although there is one imaging control apparatus 100 in FIG. 1, there may be a plurality of imaging control apparatuses 100. Alternatively, a configuration may be taken such that the respective components of one imaging control apparatus 100 are distributed and held across the plurality of imaging control apparatuses 100.

The CPU 101 is a central processing unit and comprehensively controls the respective components in the imaging system 10. The CPU 101 realizes the respective functions of the imaging control apparatus 100 by executing arithmetic processing and various programs using a control program stored in the ROM 103. The imaging control apparatus 100 may have one or more dedicated pieces of hardware different from the CPU 101, which perform at least a part of the processing by the CPU 101. Dedicated hardware includes, for example, ASICs (Application Specific Integrated Circuits), FPGAs (Field-Programmable Gate Arrays), and DSPs (Digital Signal Processors).

The RAM 102 is used as a main memory of the CPU 101, for example, a temporary storage region such as a work area. The RAM 102 is a volatile memory, such as a DRAM and SRAM. The ROM 103 has a storage region for storing parameters to be set in a boot program, the control program, and the respective components of the imaging control apparatus 100. The ROM 103 is a non-volatile memory, for example, a mask ROM, EPROM, EEPROM, flash memory, and the like.

The video reception I/F 104 is an interface for receiving video signals. The video reception I/F 104 is, for example, an HDMI® (High Definition Multimedia Interface), an SDI (Serial Digital Interface), and the like. The video transmission I/F 105 is an interface for transmitting video signals and is an HDMI (registered trademark) and an SDI, which are the same as the video reception I/F 104. The network I/F 106 is an interface that performs communication between the imaging control apparatus 100 and peripheral apparatuses. A network may be, for example, a wired or wireless network such as a LAN (Local Area Network). The imaging control apparatus 100 transmits and receives various types of information through the network I/F 106.

The bus 107 is a data transferring path connecting between the respective components in the imaging control apparatus 100 and between the imaging control apparatus 100 and an external apparatus (not illustrated). The CPU 101 controls the respective components of the imaging control apparatus 100 via the bus 107. The processing of the flowcharts described later is realized by a program stored in the ROM 103, the external storage apparatus (not illustrated), or the like being transferred to the RAM 102 and then being executed by the CPU 101.

The storage unit 108 is a storage apparatus for storing data, programs, and the like and is, for example, an HDD and SSD. The communication unit 109 is capable of transmitting a result of processing of the CPU 101 to an external apparatus (not illustrated). Alternatively, the communication unit 109 can receive a user input from an external apparatus (not illustrated) and transmit a reception result to the CPU 101. The imaging apparatus 110 is controlled for the imaging control apparatus 100 to perform automatic imaging. The imaging apparatus 110 includes a mechanism capable of operating PTZ, for example, a network camera. The imaging apparatus 110 receives an operation instruction from the imaging control apparatus 100 and performs automatic imaging based on the PTZ control thereof. A PTZ control instruction is transmitted from the imaging control apparatus 100 to the imaging apparatus 110 via the network 130 to be described later.

The server 120 performs control of the entire imaging system 10 related to automatic imaging. The server 120 determines and instructs an automatic imaging method and performs processing for distributing a captured video and the like. The respective apparatuses in the imaging system 10 are connected to each other via the network 130 and perform data exchange by communication. The network 130 is a communication network for transmitting and receiving data, signals, and the like between the imaging control apparatus 100 and an external apparatus (not illustrated). The network 130 includes, for example, a plurality of routers, switches, cables, and the like that satisfy a communication standard such as Ethernet®. In the present embodiment, the network 130 may be any network that allows communication between the imaging control apparatus 100 and other apparatuses and may be configured to any scale by any communication standard. The network 130 may be, for example, the Internet, a wired LAN, a wireless LAN, and a WAN.

Figure 2:
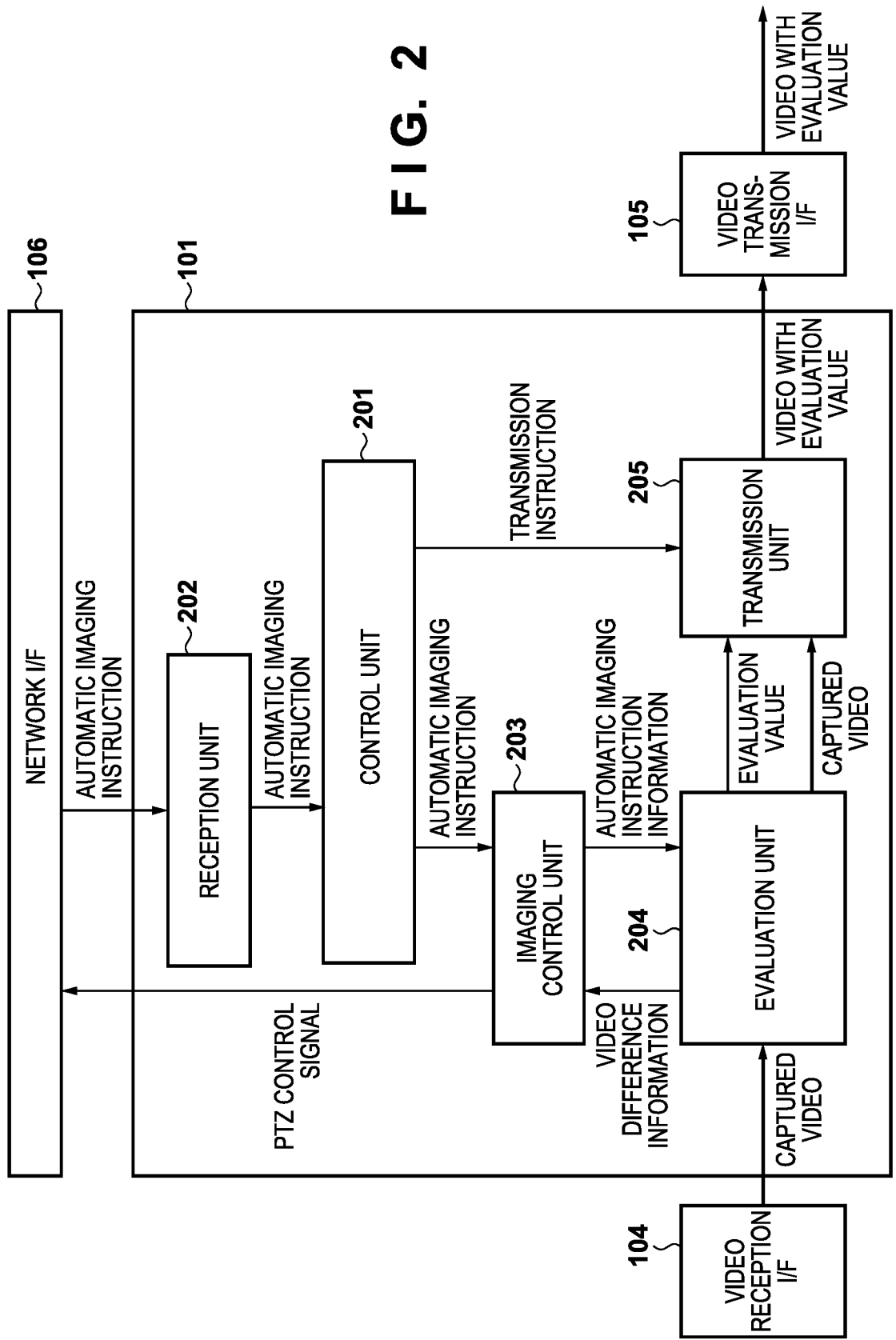
FIG. 2 is a diagram illustrating a functional configuration of the imaging control apparatus according to the present embodiment.

FIG. 2 is a diagram illustrating a functional configuration of the imaging control apparatus 100 according to the present embodiment. The functional configuration of the imaging control apparatus 100 is realized by the CPU 101 executing a program stored in the ROM 103 using the RAM 102 as a work memory. It is not necessary that all of the processing described below is always performed by the CPU 101. The imaging control apparatus 100 may be configured such that part or all of the processing is performed by one or more processing circuits other than the CPU 101 (not illustrated). Note that description will be omitted for the configuration described in FIG. 1. The CPU 101 includes a control unit 201, a reception unit 202, an imaging control unit 203, an evaluation unit 204 and a transmission unit 205.

The control unit 201 performs control related to automatic imaging as a whole. Automatic imaging is realized by the control unit 201 executing instruction and control for the respective functional units. The reception unit 202 receives an instruction related to automatic imaging via the network I/F 106. The instruction for automatic imaging is transmitted from the server 120. The imaging control unit 203 performs automatic imaging based on the received automatic imaging instruction and an evaluation result obtained by the evaluation unit 204 to be described later. The imaging control unit 203 generates a PTZ control signal for controlling the imaging apparatus 110 in accordance with automatic imaging to be performed and transmits the signal to the imaging apparatus 110 via the network I/F 106. The evaluation unit 204 evaluates the video based on a difference between the video received from the video reception I/F 104 and the automatic imaging instruction and evaluates whether or not intended automatic imaging is being performed. The transmission unit 205 transmits data, in which the captured video signal and the evaluation value of the automatic imaging obtained by the evaluation unit 204 are associated, to the video transmission I/F 105.

Figure 3:
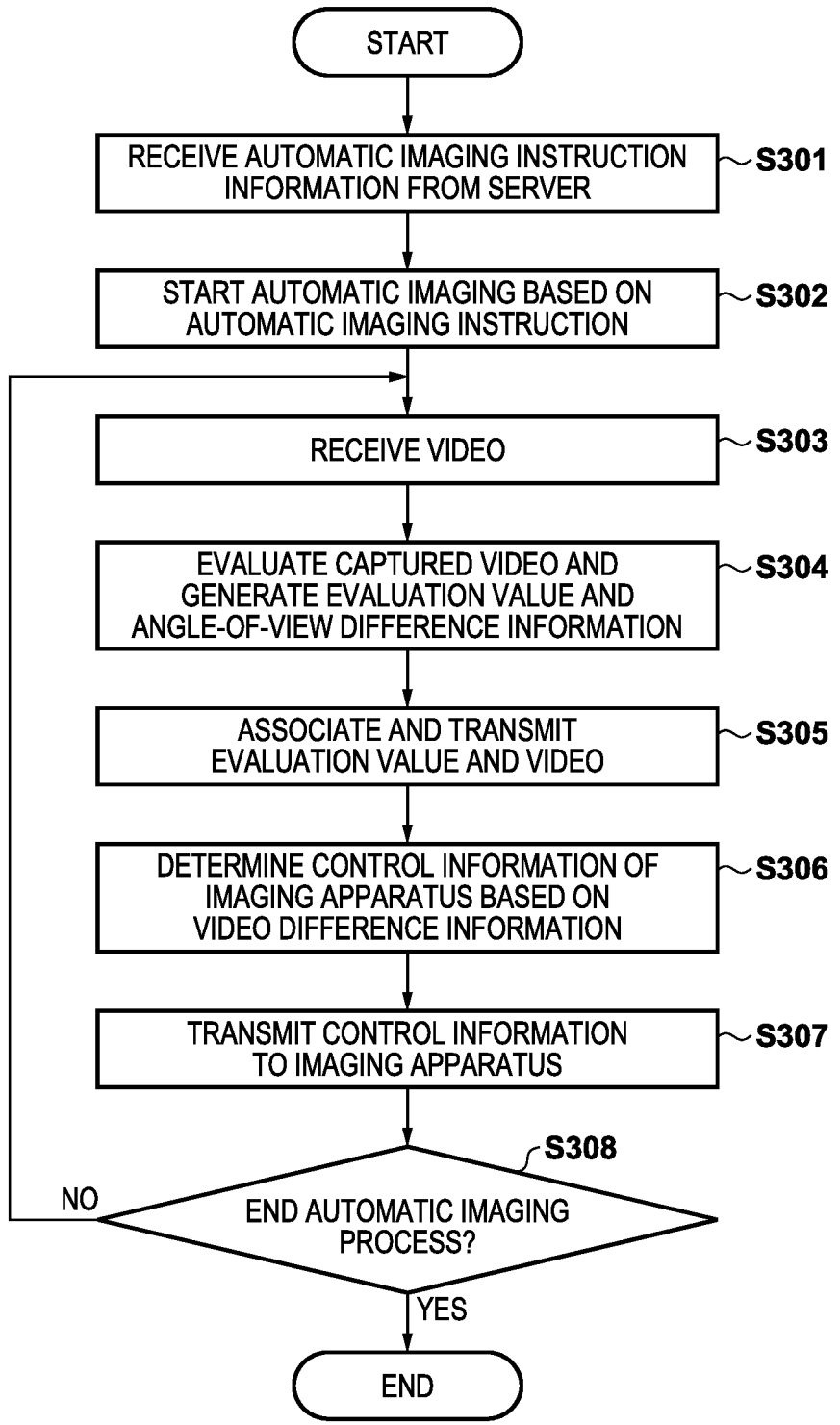
FIG. 3 is a flow of imaging by the imaging control apparatus according to a first embodiment.

Next, the flow of automatic imaging processing will be described. FIG. 3 illustrates a flow of imaging by the imaging control apparatus 100 according to a first embodiment. In step S301, the reception unit 202 of the imaging control apparatus 100 receives an automatic imaging instruction from the server 120 and transmits it to the control unit 201. In step S302, the imaging control unit 203 starts automatic imaging by transmitting a PTZ control signal to the imaging apparatus 110 based on the automatic imaging instruction. Automatic imaging is started by an instruction from the control unit 201 being transmitted to the imaging control unit 203. In step S303, the evaluation unit 204 receives video to be evaluated from the video reception I/F 104. In the present embodiment, the evaluation unit 204 receives video that is continuously inputted in units of frames and evaluates each frame.

In step S304, the evaluation unit 204 evaluates the received video and generates an evaluation value of the video. The evaluation value is an indicator that represents the usability of the video. Further, the evaluation unit 204 generates information on the difference between video that should be captured based on the automatic imaging instruction and the received video. Details on the generation of the evaluation value will be described later. In step S305, the transmission unit 205 transmits data in which the evaluation value generated by the evaluation unit 204 is associated with the video signal. In step S306, the control unit 201 determines information on control to be executed by the imaging apparatus 110 based on the video difference information obtained by the evaluation unit 204. After the control information has been determined, in step S307, the imaging control unit 203 transmits the control information to the imaging apparatus 110. In step S308, the control unit 201 determines whether or not to continue automatic imaging based on a continue instruction for automatic imaging from the server 120. When the control unit 201 determines that there is a continue instruction from the server 120 (No in step S308), the process returns to step S303. Description will be omitted for the subsequent processing because it is the same as the above. When the control unit 201 determines that there is no continue instruction from the server 120 (Yes in step S308), the process ends.

Figure 4A:
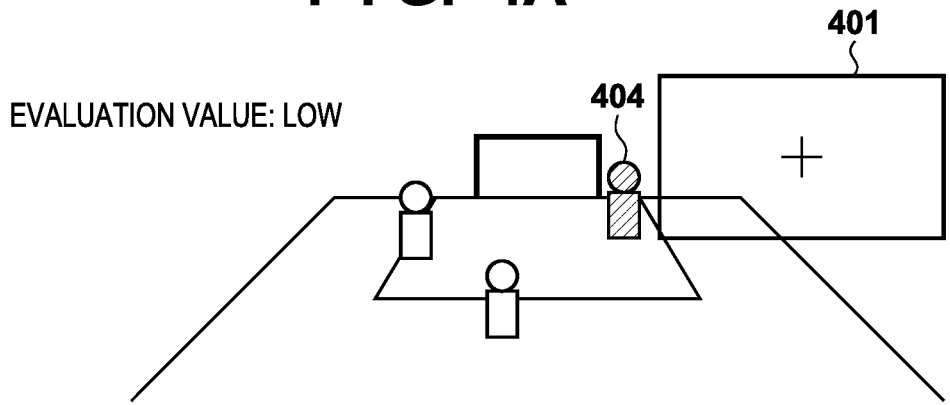
FIG. 4A is a diagram for explaining an evaluation value of a video according to the first embodiment.
Figure 4B:
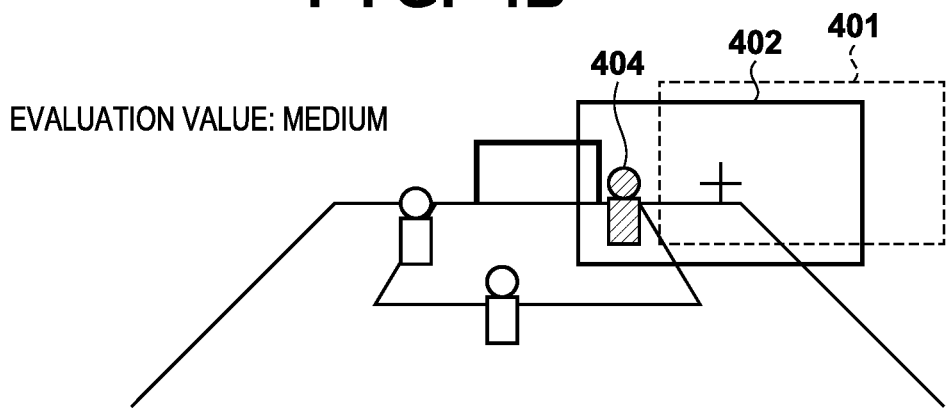
FIG. 4B is a diagram for explaining an evaluation value of a video according to the first embodiment.
Figure 4C:
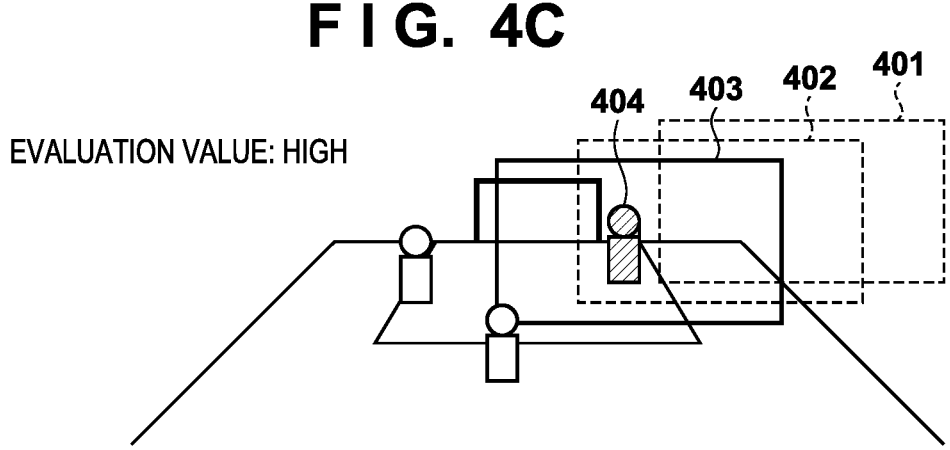
FIG. 4C is a diagram for explaining an evaluation value of a video according to the first embodiment.

Next, the evaluation value of a video according to the first embodiment will be described. The automatic imaging of the first embodiment performs imaging while tracking a subject. In the present embodiment, evaluation is performed such that the evaluation value becomes higher when the subject is captured in the video and the subject is closer to the center of the video. FIGS. 4A to 4C are diagrams for explaining the evaluation values of videos according to the first embodiment. FIGS. 4A to 4C illustrate examples of scenes of a plurality of players playing in the vicinity of a penalty area of a soccer stadium, for example. Hereinafter, a method of evaluating an evaluation value will be described using a scene in which imaging is performed while tracking a subject of interest (e.g., soccer player). The present embodiment describes a method of evaluating an evaluation value of a video using a case where there is one subject of interest. The number of subjects is not limited to one, and there may be a plurality of subjects. FIG. 4A illustrates a video with a low evaluation value, FIG. 4B illustrates a video with a medium amount evaluation value, and FIG. 4C illustrates a video with a high evaluation value. A subject 404 in FIGS. 4A to 4C indicates a subject to be tracked at the time of automatic imaging. The subject 404 is indicated by a hatched human model. A video 401, a video 402, and a video 403 from FIGS. 4A to 4C illustrate the respective imaging ranges when imaging is performed while tracking the subject 404.

In FIG. 4A, since the subject 404 is not captured in the video 401, the evaluation unit 204 determines that the evaluation value of the video 401 is low. In FIG. 4B, the subject 404 is captured at the left edge of the video 402 but is not captured in the center of the video 402. Therefore, the evaluation unit 204 determines that the evaluation value of the video 402 is of a medium amount. Further, in FIG. 4B, the video 401 is displayed by a dashed line, and the evaluation unit 204 can obtain video difference information based on the difference between the video 401 and the video 402. In FIG. 4C, since the subject 404 is captured in the center of the video 403, the evaluation unit 204 determines that the evaluation value of the video 403 is high. Further, in FIG. 4C, the video 401 and the video 402 are displayed by dashed lines, and the evaluation unit 204 can obtain video difference information based on the difference between the video 401 or the video 402 and the video 403. The evaluation values of the present embodiment are evaluated in three levels (low, medium, high), but limitation is not made to this; the evaluation values may be evaluated using ranks of more than three levels and may be denoted numerically.

Figure 5:
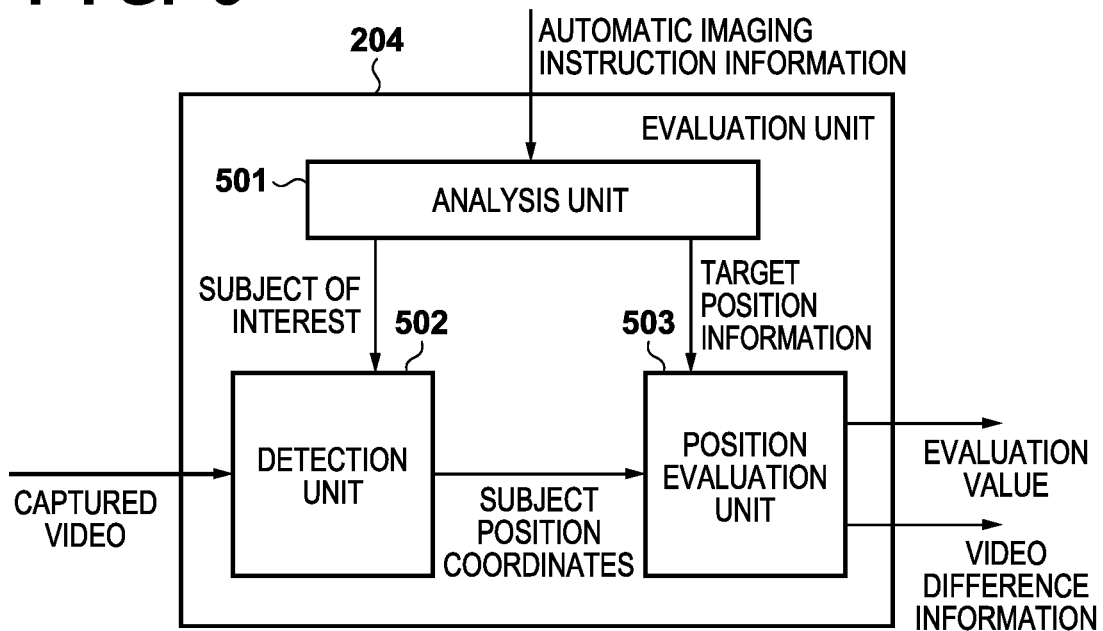
FIG. 5 is a diagram illustrating the details of an evaluation unit according to the first embodiment.

A method of obtaining the evaluation value in step S304 of FIG. 3 will be described in detail with reference to FIGS. 5 and 6. FIG. 5 is a diagram illustrating the details of the evaluation unit 204 according to the first embodiment. The evaluation unit 204 in FIG. 5 includes an analysis unit 501, a detection unit 502 and a position evaluation unit 503. The analysis unit 501 analyzes the automatic imaging instruction information received from the imaging control unit 203. The automatic imaging instruction information is, for example, "perform imaging in which the subject 404 is positioned in the center of the video". The automatic imaging instruction information is also called capturing information. Here, the analysis unit 501 decomposes the automatic imaging instruction information into target subject information and target position information, which indicates where in the video to capture the subject 404. The target position information is also referred to as a set position. The target subject information is, for example, information indicating features such as the size of a player's face and body. The target position information is represented by, for example, a two-dimensional coordinate system (X, Y). The detection unit 502 detects the subject 404 instructed by the analysis unit 501 from the inputted captured video and calculates the position at which the subject is detected as positional coordinates. The position evaluation unit 503 evaluates the position of the subject 404 based on the target position information obtained by the analysis unit 501 and the positional coordinates of the subject 404 obtained by the detection unit 502. For example, the position evaluation unit 503 can calculate the evaluation value of a video by referring to a table (not illustrated) in which the evaluation results of the position of the subject 404 and the evaluation values of the video are associated. The table may be stored in advance in the storage unit 108 or the like.

Figure 6:
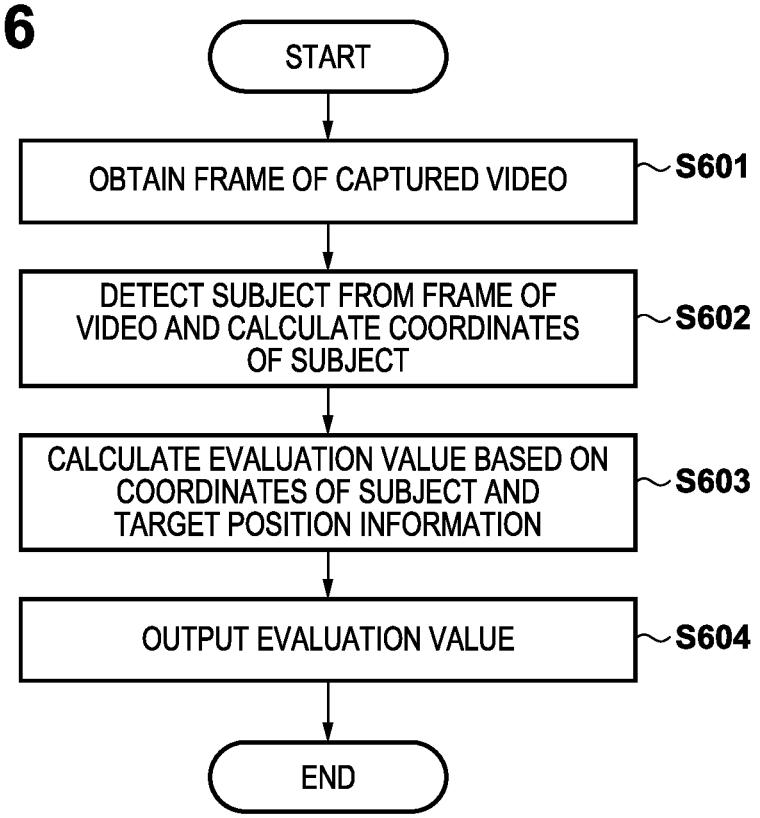
FIG. 6 is a flow of obtaining an evaluation value of automatic imaging according to the first embodiment.

FIG. 6 illustrates a flow of obtaining an evaluation value of automatic imaging according to the first embodiment. The process of obtaining an evaluation value of automatic imaging will be described with reference to FIG. 6. In FIG. 6, the process of obtaining an evaluation value of one frame of interest of a video will be described. In step S601, the evaluation unit 204 obtains one frame of a video captured by the imaging apparatus 110 and inputs it to the detection unit 502. In step S602, the detection unit 502 detects the subject 404 from the frame of the inputted video and calculates the positional coordinates thereof. In step S603, the position evaluation unit 503 calculates an evaluation value based on the position information of the subject 404 and the target position information. In step S604, the position evaluation unit 503 outputs the evaluation value.

The transmission of an evaluation value described in step S305 of FIG. 3 will be described in detail with reference to FIG. 7. FIG. 7 is a diagram illustrating the correspondence between a video and evaluation values according to the present embodiment. FIG. 7 illustrates frames 701 to 705 of a video arranged in order of time of imaging with the earliest on the left. In the frames 703 to 705, the subject 404 is captured. Also illustrated in FIG. 7 are evaluation values 711 to 715 corresponding to the frames of the video. Since the subject 404 is not captured in the frame 701, the evaluation value 711 is 0. Since the subject 404 is not captured in the frame 702, the evaluation value 712 is 0. Since the subject 404 is captured on the left edge in the frame 703, the evaluation value 713 is 20. Since the subject 404 is captured on the left in the frame 704, the evaluation value 714 is 50. Since the subject 404 is captured roughly in the center in the frame 705, the evaluation value 715 is 80. In the present embodiment, data including a frame and an evaluation value of a video as illustrated in FIG. 7 is transmitted.

FIG. 8 is a diagram for explaining a data format for when sending an evaluation value in association with a video according to the present embodiment. Frame data 800 is data of one frame pertaining to a video and includes header information 801, video data 802, and audio data 803. The frame data 800 may include an evaluation value storage region 804 in a portion of the header information 801. Thus, by writing an evaluation value to the evaluation value storage region 804 and transmitting a frame of a video, the evaluation value corresponding to the frame of the video can be transmitted.

An effect of the invention of the present embodiment will be described with reference to FIG. 9. Similar to FIG. 7, FIG. 9 is a diagram illustrating the frames of a video captured by automatic imaging and corresponding evaluation values. FIG. 9 includes a threshold 901, usable video periods 902 and 903, and frames 904. The threshold 901 is set for the evaluation value and is set to determine whether a frame of a video is usable. The present embodiment can determine whether or not the video has been captured as intended based on whether the evaluation value is equal to or greater than the threshold 901. The threshold 901 may be set in accordance with the video quality requested by the user. For example, when the threshold 901 is set higher, the frames of the video become closer to a video that has been captured as intended, and when the threshold 901 is set lower, the frames of the video become different from a video that has been captured as intended. The periods in which the frames of a video greater than or equal to the threshold 901 are present are represented as usable video periods 902 to 903. In the usable video period 902, there are two evaluation values (illustrated in dark bars), which indicate that two frames of the video corresponding to the respective two evaluation values are usable. In the usable video period 903, there are four evaluation values (illustrated in dark bars), which indicate that four frames of the video corresponding to the respective four evaluation values are usable. The present embodiment can easily determine usable frames of a video by setting an arbitrary threshold for the evaluation value and can ensure that the quality of a distributed video is a certain level or above.

As described above, according to the first embodiment, in automatic imaging performed while tracking the subject, the evaluation value of the video can be calculated based on a predefined target position in a video and the position of the subject in the captured video. Further, by transmitting data including the video and the evaluation value, it can be determined whether or not the video that has been automatically captured is the intended video. By setting an arbitrary threshold for the evaluation value, the quality of a distributed video can be ensured to be above a certain level. According to the first embodiment, it is possible to easily recognize whether the result of capturing by automatic imaging is an intended video.

Second Embodiment

A second embodiment utilizes an inference network obtained by machine learning to obtain the evaluation values of an automatically captured video. The second embodiment can evaluate a more complex scene than the scene illustrated in the first embodiment by utilizing machine learning. A complex scene refers to, for example, a "desirable composition that accords with the scene". The desirable composition that accords with the scene is also called a predetermined composition. Description will be omitted for the functional configuration and the flow of automatic imaging of the imaging control apparatus 100 in the second embodiment because they are the same as in the first embodiment.

Figure 10A:
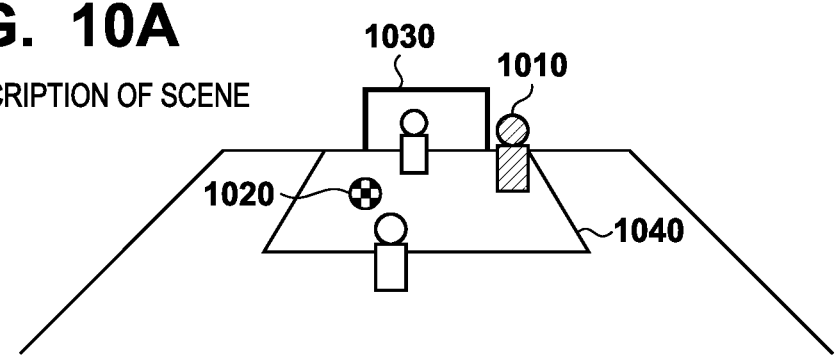
FIG. 10A is a diagram for explaining an evaluation value of a video according to a second embodiment.
Figure 10B:
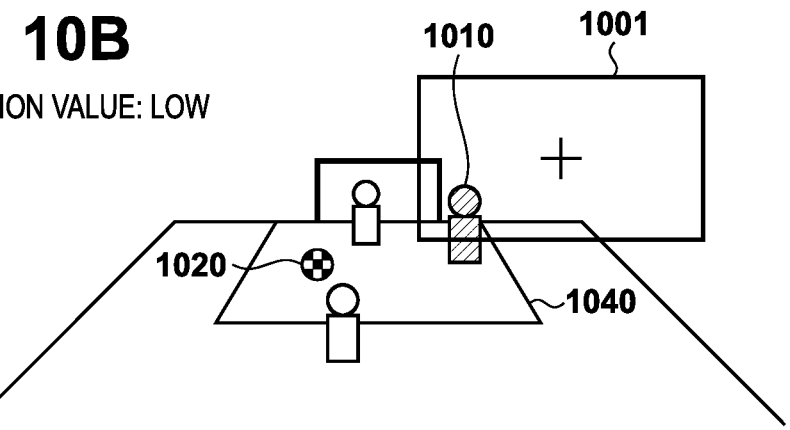
FIG. 10B is a diagram for explaining an evaluation value of a video according to the second embodiment.
Figure 10C:
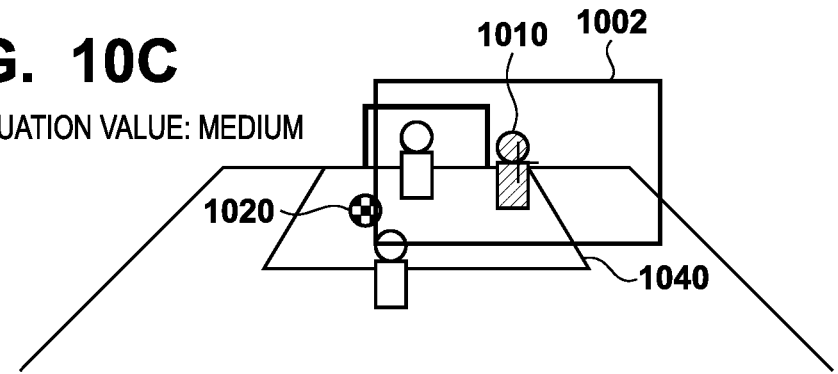
FIG. 10C is a diagram for explaining an evaluation value of a video according to the second embodiment.
Figure 10D:
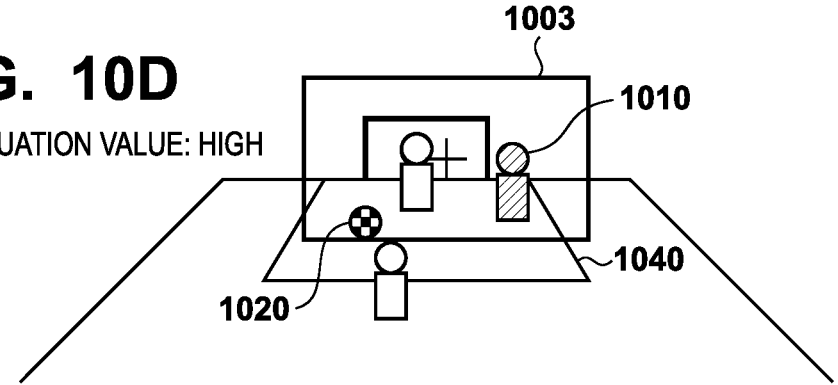
FIG. 10D is a diagram for explaining an evaluation value of a video according to the second embodiment.

FIGS. 10A to 10D are diagrams for explaining the evaluation values of videos according to the second embodiment. Similar to FIGS. 4A to 4C, FIG. 10A illustrates an example of a scene of a plurality of players playing in the vicinity of a penalty area of a soccer stadium. FIG. 10A includes a subject 1010, a ball 1020, a soccer goal 1030, and a penalty area 1040. FIG. 10A illustrates a scene in which the ball 1020 has been added to the imaging scenes in FIGS. 4A to 4C. The ranges of videos of a video 1001 to a video 1003 from FIGS. 10B to 10D are all the same.

In a method of evaluation of the evaluation value in the second embodiment, the evaluation value is increased when the target subject is captured and the video has a desirable composition that accords with the scene. In the present embodiment, a desirable composition (hereinafter, a desirable composition) that accords with the scene refers to a composition that includes the ball 1020 and the soccer goal 1030 in the penalty area 1040. The calculation of the evaluation value is executed by the inference network obtained by machine learning. Next, the correspondence between the respective videos and the evaluation values of FIGS. 10B to 10D will be described. In FIG. 10B, since the subject 1010 is captured in the lower left of the video 1001 but is not captured in the desirable composition, the evaluation value of the video 1001 is determined to be low. In FIG. 10C, since the subject 1010 is captured in the center of the video 1002 but is not captured with the ball 1020, which is the desirable composition, the evaluation value of the video 1002 is determined to be approximately medium. In FIG. 10D, since the subject 1010 is captured in the desirable composition in the video 1003, the evaluation value of the video 1003 is determined to be high. The evaluation values of the present embodiment are evaluated in three levels (low, medium, high), but limitation is not made to this; the evaluation values may be evaluated using ranks that are greater than three levels and may be denoted numerically.

Figure 11:
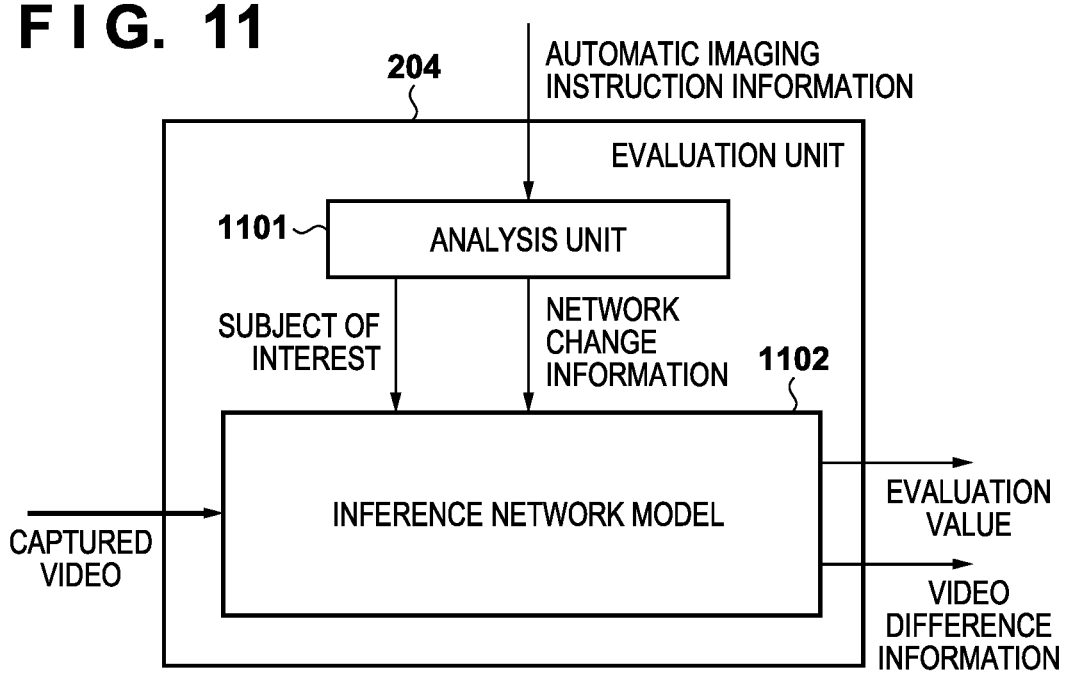
FIG. 11 is a diagram illustrating the details of the evaluation unit according to the second embodiment.

A method of obtaining an evaluation value in the second embodiment will be described with reference to FIGS. 11 and 12. FIG. 11 is a diagram illustrating the details of the evaluation unit according to the second embodiment. An analysis unit 1101 in FIG. 11 performs a process of analyzing the received automatic imaging instruction information. The automatic imaging instruction information of the present embodiment includes, for example, "perform imaging using a desirable composition in which the subject 1010 is captured." The analysis unit 1101 generates network model change information in order to use an inference network model in which an evaluation value calculated based on the target subject information and the desirable composition becomes higher. An inference network model 1102 outputs the video difference information indicating the difference between the evaluation value of the video and the desired composition based on the captured video to be input. Learning for obtaining the inference network model 1102 will be described later.

Figure 12:
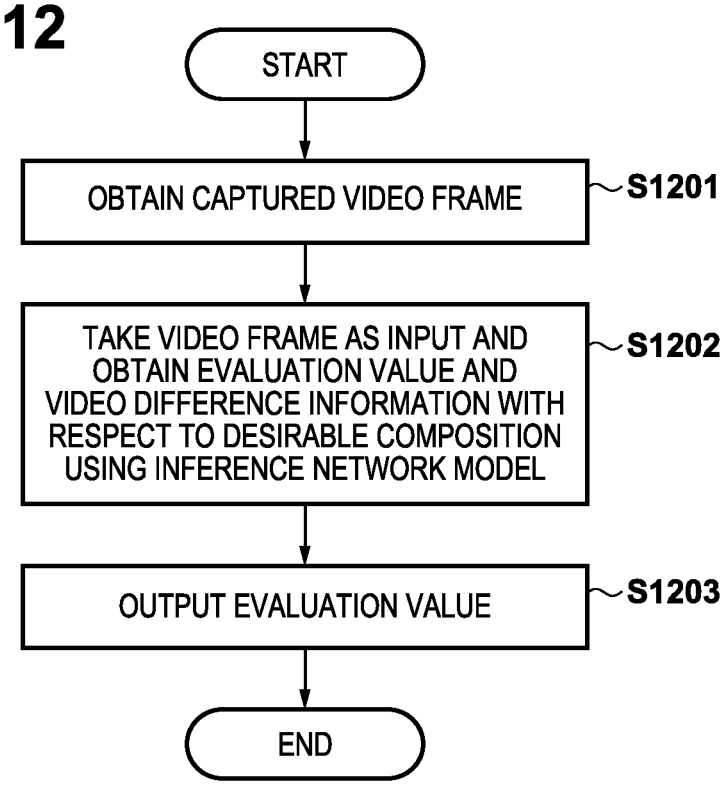
FIG. 12 is a flow of obtaining an evaluation value of automatic imaging according to the second embodiment.

FIG. 12 is a flow of obtaining an evaluation value of automatic imaging according to the second embodiment. A process for obtaining an evaluation value of automatic imaging in the second embodiment will be described with reference to the flowchart of FIG. 12. In the flowchart of FIG. 12, a change has already been made to an appropriate inference network model, and a flow of obtaining an evaluation value for one frame of a video is illustrated. In step S1201, the inference network model 1102 obtains one frame of a video captured by the imaging apparatus 110. In step S1202, the inference network model 1102 outputs an evaluation value of the inputted video and the information on difference of the video from the desired composition. In step S1203, the inference network model 1102 outputs an evaluation value of one frame of video. Data including one frame of video and an evaluation value is transmitted.

Figure 13:
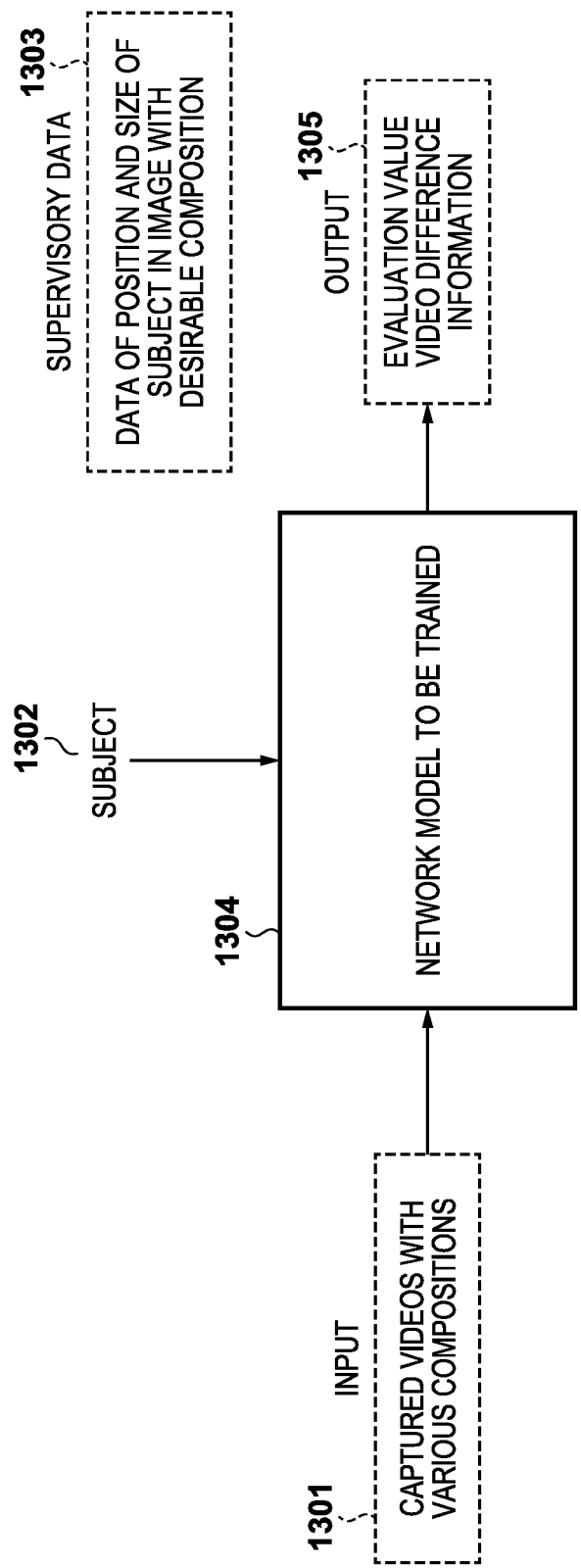
FIG. 13 is a diagram for explaining learning of an inference network model according to the second embodiment.

Here, learning for generating the inference network model 1102 of the second embodiment will be described. FIG. 13 is a diagram for explaining learning of an inference network model according to the second embodiment. FIG. 13 illustrates an input 1301, a subject 1302, supervisory data 1303, a learning network model 1304, and an output 1305. The input 1301 is video of the subject 1302 in various compositions captured by the imaging apparatus 110 or the like. The subject 1302 is, for example, a soccer player as described above. The supervisory data 1303 is data that trains the learning network model 1304 and is also referred to as a ground truth image. The supervisory data 1303 includes data of the position and size of the subject 1302 in an image in the desired composition for each imaging scene. The data includes video and includes information on the position and size of the subject 1302 in a composition of a soccer goal scene, for example. The desirable composition may be determined, for example, by a result evaluated in advance by a user for the distributed video.

The learning network model 1304 is a convolutional neural network (CNN) which, for example, is used in image processing techniques in general. A CNN is a learning-type image processing technology which repeatedly carries out nonlinear operations after convolving a filter generated by learning over an image. A CNN is also called a model. A filter is a detector for extracting features of an image and is also referred to as a local receptive field. An image obtained by a nonlinear operation in which a filter is convolved over an image is called a feature map. Also, learning of the CNN is performed based on learning data including a pair of input and output images. Specifically, the learning of the CNN involves generating values (parameters) of a filter that can be converted with high accuracy and correcting the parameters to obtain an output image from an input image.

The output 1305 is an evaluation value and video difference information obtained from a difference between captured video, which the input 1301, and video of the supervisory data 1303. The learning network model 1304 learns by correcting parameters of the model based on the output 1305. Thus, the inference network model 1102 is obtained. The learning method of the learning network model 1304 is not limited to the above. For example, when reinforcement learning is used for learning of the learning network model 1304, a method in which the reward is a subjective evaluation value indicating the quality of the composition and the composition is optimized such that the subjective evaluation value becomes higher may be used. The inference network model 1102 of the present embodiment is an example, and an inference network model capable of evaluating the inputted video may be used.

As described above, according to the second embodiment, the evaluation value of a video is calculated by the inference network model obtained by machine learning, and the data including the video and the evaluation value can be transmitted. Thus, it is possible to easily determine whether or not the video captured by automatic imaging is captured as intended, and thereby the convenience for when distributing the captured video is improved. According to the second embodiment, it is possible to easily recognize whether the result of capturing by automatic imaging is an intended video.

Third Embodiment

In a third embodiment, an automatic imaging system for distributing an appropriate video selected by the user from among a plurality of videos automatically captured by a plurality of imaging apparatus will be described. In the third embodiment, by displaying an evaluation value of a video together with the video for the video captured in the respective imaging apparatuses, a state of the video obtained by automatic imaging can be easily determined. Further, the present embodiment provides an automatic imaging system for determining whether or not video can be selected as distribution video. Description will be omitted for the functional configuration and the flow of automatic imaging processing of the imaging control apparatus in the third embodiment because they are the same as in the first embodiment.

Figure 14:
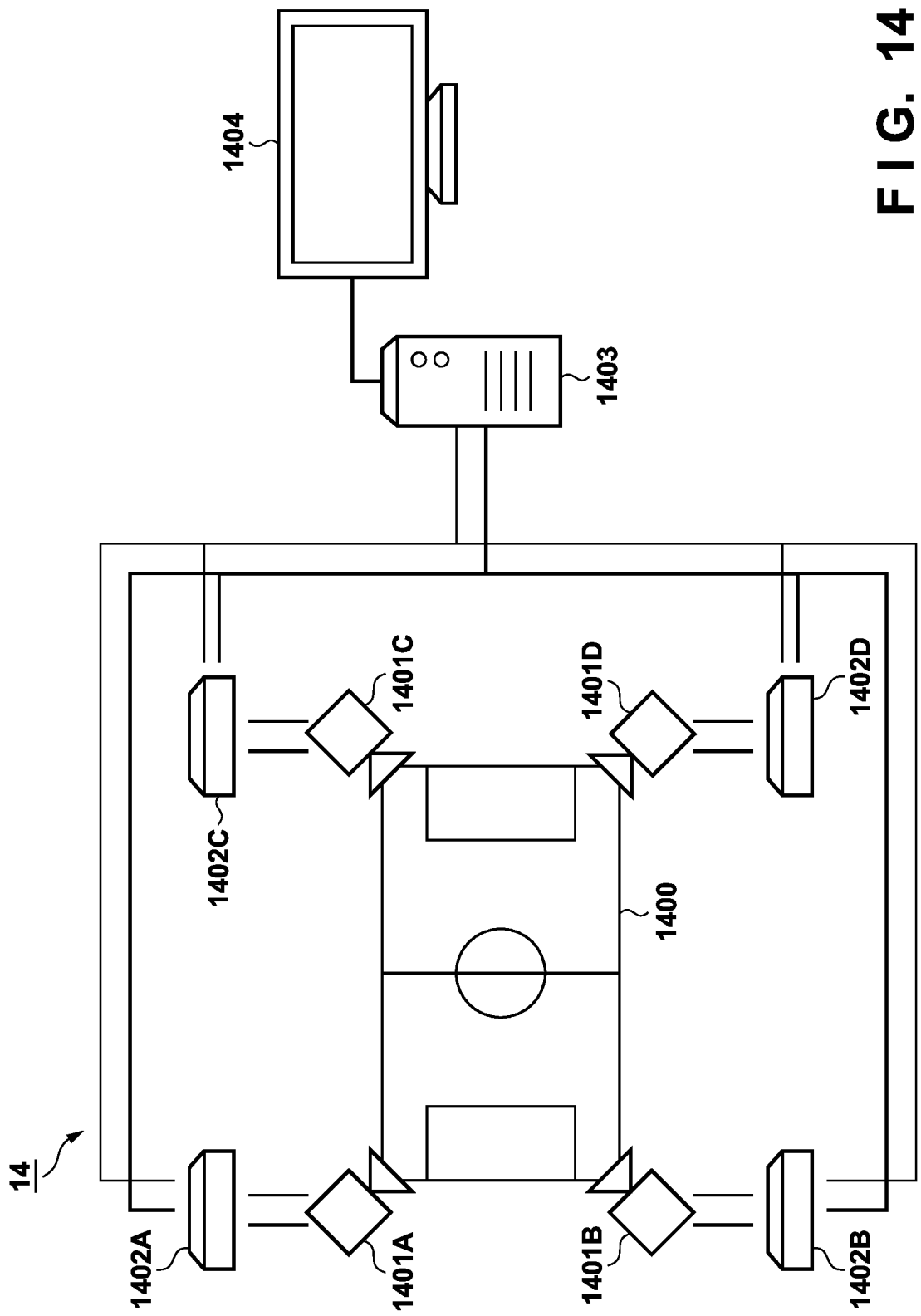
FIG. 14 is a diagram for explaining the overall configuration of an automatic imaging system according to a third embodiment.

FIG. 14 is a diagram for explaining the overall configuration of the automatic imaging system according to the third embodiment. In the third embodiment, an automatic imaging system 14 in which imaging is performed using four imaging apparatus will be described.

In FIG. 14, the automatic imaging system 14 includes imaging control apparatuses 1402A to 1402D, imaging apparatuses 1401A to 1401D, a server 1403, and a display apparatus 1404. A subject 1400 in FIG. 14 is a diagram overlooking a soccer stadium, for example. The imaging apparatus 1401A is positioned on the upper left of the subject 1400, and the imaging apparatus 1401B is positioned on the lower left of the subject 1400. The imaging apparatus 1401C is positioned on the upper right of the subject 1400, and the imaging apparatus 1401D is positioned on the lower right of the subject 1400. With such a positioning of imaging apparatuses, the automatic imaging system 14 can capture the entire subject 1400. The imaging control apparatus 1402A is connected to the imaging apparatus 1401A, and the imaging control apparatus 1402B is connected to the imaging apparatus 1401B. The imaging control apparatus 1402C is connected to the imaging apparatus 1401C, and the imaging control apparatus 1402D is connected to the imaging apparatus 1401D. The imaging control apparatuses 1402A to 1402D perform imaging control of the imaging apparatuses 1401A to 1401D, respectively.

The server 1403 is connected to the imaging control apparatus 1402A to 1402D and instructs the imaging apparatus 1401A to 1401D to perform imaging via the respective imaging control apparatuses. In addition, the server 1403 collects and distributes videos captured by the respective imaging apparatus. The server 1403 is connected to the display apparatus 1404, and the display apparatus 1404 displays a video received from the server 1403. The display apparatus 1404 may be, for example, an LCD (liquid crystal display), an OLED (organic light-emitting diode display), and the like. The respective imaging control apparatuses corresponding to the respective imaging apparatuses have been described as being separate, but they may be integrated. The respective imaging control apparatuses may be mounted on the server 1403. The server 1403 and the display apparatus 1404 may be integrated.

Figure 15:
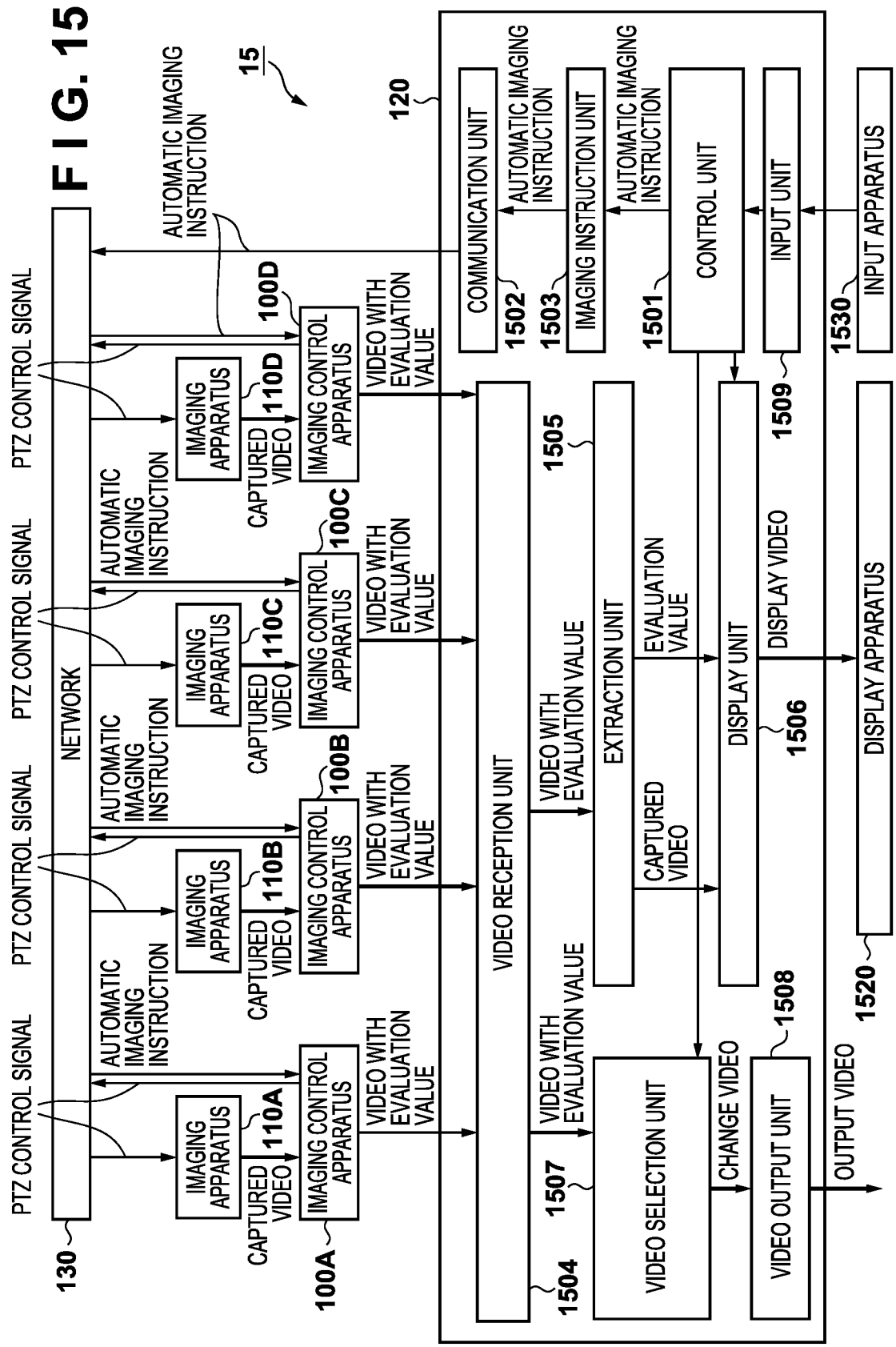
FIG. 15 is a functional block diagram of the automatic imaging system according to the third embodiment.

The automatic imaging system of the third embodiment will be described with reference to FIG. 15. FIG. 15 is a functional block diagram of the automatic imaging system according to the third embodiment. The configurations that are the same as the first embodiment are denoted by the same reference numerals, and description of these configurations will be omitted. In FIG. 15, the automatic imaging system 15 includes imaging control apparatuses 100A to 100D, imaging apparatuses 110A to 110D, the server 120, the network 130, a display apparatus 1520, and an input apparatus 1530. The imaging control apparatuses 100A to 100D are apparatuses for controlling the imaging apparatuses. The imaging apparatus 110A to 110D are apparatuses for capturing a subject. The imaging control apparatuses 100A to 100D control the respective imaging apparatuses by being connected to the respectively corresponding 110A to 110D. The configuration of the imaging control apparatuses 100A to 100D are the same as the first embodiment illustrated in FIGS. 1 and 2, and thus description thereof will be omitted.

The functional configuration of the server 120 will be described below. The server 120 includes a control unit 1501, a communication unit 1502, an imaging instruction unit 1503, a video reception unit 1504, and an extraction unit 1505. The server 120 also includes a display unit 1506, a video selection unit 1507, a video output unit 1508, and an input unit 1509. The control unit 1501 performs various controls in the server 120. The communication unit 1502 is a network interface for connecting an external network and the server 120. The communication unit 1502 enables communication between the server 120 and the imaging control apparatuses 100A to 100D via the network 130. The communication unit 1502 transmits automatic imaging instructions to, for example, the imaging control apparatuses 100A to 100D determined by the server 120.

The imaging instruction unit 1503 instructs the imaging control apparatus controlled by the control unit 1501 to perform automatic imaging. The imaging instruction unit 1503 transmits an automatic imaging instruction to the designated imaging apparatus via the communication unit 1502. The video reception unit 1504 receives the videos captured by the respective imaging apparatuses. The video reception unit 1504 can simultaneously receive a plurality of videos captured by the imaging apparatuses 110A to 110D. The extraction unit 1505 extracts an evaluation value from a video received by the video reception unit 1504. The display unit 1506 performs processing for displaying videos and extracted evaluation values on the display apparatus 1520 to be described later. The display unit 1506 displays an extracted evaluation value superimposed on a video.

The video selection unit 1507 selects a video for distribution based on the user selection from among the videos captured by the plurality of imaging apparatuses. The video selection unit 1507 can receive a user selection via the input apparatus 1530 to be described later. The video output unit 1508 outputs the video selected by the video selection unit 1507 as the distribution video. The input unit 1509 receives information inputted to the input apparatus 1530 and transmits the information to the control unit 1501. The display apparatus 1520 displays the videos captured by the plurality of imaging apparatuses, superimposed with evaluation value information. The input apparatus 1530 is an apparatus for inputting information from the user and is, for example, a mouse, a keyboard and a joystick.

Here, an example of a screen displayed by the display apparatus 1520 of FIG. 15 will be described with reference to FIG. 16. FIG. 16 is a diagram for explaining an example of simultaneously displaying a plurality of videos and evaluation values according to the third embodiment. In FIG. 16, a screen 1600 includes a screen 1602, a screen 1604, a screen 1606, a screen 1608, a display 1610, and a display 1620. The screen 1600 has a screen that has been divided into four sections, the respective screens displaying the respective videos captured by the imaging apparatuses 110A to 110D. In addition, each screen displays a captured video, superimposed with an evaluation value of automatic imaging and an identification display, which indicates whether or not an intended imaging is being carried out. The identification display is also referred to as additional information and, in the present embodiment, indicates color-coded icons. The display 1610 is displayed when the evaluation value of a video is equal to or greater than a threshold. The display 1610 signifies that intended automatic imaging is being performed and is displayed as a dark-colored circle. Meanwhile, the display 1620 is displayed when the evaluation value of a video is less than the threshold and signifies that intended automatic imaging is not being performed. The display 1620 is displayed in a light-colored circle.

Hereinafter, the screens 1602 to 1608 displayed on the screen 1600 will be described in detail. The screen 1602 is displayed on the upper left of the screen 1600 and displays the evaluation value 80 and the display 1610 on the video captured by the imaging apparatus 110A. The screen 1604 is displayed on the upper right of the screen 1600 and displays the evaluation value 40 and the display 1620 on the video captured by the imaging apparatus 110B. The screen 1606 is displayed on the lower left of the screen 1600 and displays the evaluation value 10 and the display 1620 on the video captured by the imaging apparatus 110C. The screen 1608 is displayed on the lower right of the screen 1600 and displays the evaluation value 70 and the display 1610 on the video captured by the imaging apparatus 110D. The display process described above is executed by the display unit 1506. The number of screens displayed on the screen 1600 may be changed in accordance with the number of imaging apparatuses, and it is possible to display only the screen selected by the user.

As described above, according to the third embodiment, in an automatic imaging system including a plurality of imaging apparatuses and imaging control apparatuses, it is possible to easily determine whether or not automatic imaging is as intended by displaying both a plurality of videos and evaluation values corresponding to the videos. Further, by the user selecting a video from the plurality of videos, the convenience for when distributing the captured video is improved.

Fourth Embodiment

In a fourth embodiment, an automatic imaging system for distributing an appropriate video automatically selected from among a plurality of videos automatically captured by a plurality of imaging apparatus will be described. The fourth embodiment differs from the third embodiment in that an appropriate video is automatically selected. The fourth embodiment selects a video whose evaluation value is higher among the videos captured by the respective imaging apparatuses as a distribution video. Since the functional configuration and the flow of automatic imaging processing of the imaging control apparatus in the fourth embodiment are the same as in the first embodiment and the configuration of the automatic imaging system is the same as in the third embodiment, description of the overlapping portions will be omitted.

FIG. 17 is a functional block diagram of an automatic imaging system 17 according to the fourth embodiment. The same numerals are denoted for the functional configurations that are the same as the configurations described in FIGS. 1, 2, and 15, and description thereof will be omitted. In FIG. 17, the server 120 includes a video selection control unit 1710. The video selection control unit 1710 selects a distribution video based on the evaluation value of a captured video. The video selection control unit 1710 selects, for example, a video whose evaluation value is the highest among a plurality of videos as the distribution video. Specifically, on the screen 1600 of FIG. 16, since the evaluation value 80 of the screen 1602 is the highest compared with the other screens, the video selection control unit 1710 can select the screen 1602 as the distribution video. Further, the video selection control unit 1710 may select the screen 1602 and the screen 1608 as the distribution video based on the display 1610 indicating that the video is usable. The video selection process is completed by the video selection control unit 1710 notifying the video selection unit 1507 of the video signal information of the selected screen 1602. The selection of the video described above is an example, and no limitation is made to this. The video selection method may be based on any predefined rule, and video selection processing may be performed based on the rule. AI may also be used in the video selection process. The video selection control unit 1710 selects the screen 1602 and the screen 1608 on which the display 1610 is displayed and can generate a distribution video in which the videos included in those screens are combined. Further, the video selection control unit 1710 can arbitrarily combine two or more videos that have been selected.

As described above, according to the fourth embodiment, in an automatic imaging system including a plurality of imaging apparatuses and imaging control apparatuses, it is possible to simultaneously display a plurality of captured videos and evaluation values. In addition, the automatic imaging system can automatically select a distribution video based on a video having the highest evaluation value among the plurality of videos and the corresponding evaluation values. According to the fourth embodiment, it is also possible to distribute a video in which automatically selected videos have been combined as the distribution video. Thus, it is possible to provide a video distribution system that automatically selects and distributes an appropriate video from among a plurality of captured videos.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-078787, filed May 6, 2021 which is hereby incorporated by reference herein in its entirety.

What is claimed is:

1. An imaging control apparatus for controlling an imaging apparatus, wherein the imaging apparatus is configured to track an imaging target so that the imaging target appears in a captured image, comprising:
　　at least one memory storing instructions; and
　　at least one processor that, upon execution of the instructions, is configured to:
　　obtain a predefined target position in an image to be captured by the imaging apparatus;
　　detect a position of the subject that is the imaging target from the image;
　　derive an evaluation of the detected position of the subject based on the detected position of the subject and the obtained target position;
　　transmit multiple data to a display apparatus, the multiple data including the image and a result of the evaluation derived for the image; and
　　control a display of the image and the result of the evaluation derived for each image on the display apparatus.

2. The imaging control apparatus according to claim 1, wherein
　　the at least one processor derives an evaluation value that represents a usability of the image as the evaluation based on the position of the subject and the predefined target position, and
　　the result of the evaluation includes the evaluation value.

3. The imaging control apparatus according to claim 2, wherein
　　the at least one processor determines whether the evaluation value is greater than or equal to a threshold, and
　　the result of the evaluation includes a result of the determination of the at least one processor.

4. An imaging control method for controlling an imaging apparatus configured to track an imaging target so that the imaging target appears in a captured image, comprising:
　　obtaining a predefined target position in an image to be captured by the imaging apparatus;
　　detecting a position of the subject that is the imaging target from an image;
　　deriving an evaluation of the detected position of the subject based on the detected position of the subject and the obtained target position;
　　transmitting multiple data to a display apparatus, the multiple data including the image and a result of the evaluation derived for the image; and
　　controlling a display of the image and the result of the evaluation derived for each image on the display apparatus.

5. A non-transitory computer-readable storage medium storing a program that, when executed by a computer, causes the computer to perform an imaging control method for controlling an imaging apparatus configured to track an imaging target so that the imaging target appears in a captured image, a non-transitory computer-readable storage medium comprising:
  obtaining a predefined target position in an image to be captured by the imaging apparatus;
  detecting a position of the subject that is the imaging target from the image;
  deriving an evaluation of the detected position of the subject based on the detected position of the subject and the obtained target position;
  transmitting multiple data to a display apparatus, the multiple data including the image and a result of the evaluation derived for the image; and
  controlling a display of the image and the result of the evaluation derived for each image on the display apparatus.

6. The imaging control apparatus according to claim 1, wherein
  the at least one processor derives a high evaluation value when the position of the subject is closer than a threshold to the predefined target position;
  the result of the evaluation includes the evaluation value.

7. The imaging control apparatus according to claim 1, wherein
  the at least one processor derives a lower evaluation value when the position of the subject is far farther than a threshold to the predefined target position;
  the result of the evaluation includes the evaluation value.

8. The imaging control apparatus according to claim 1, wherein
  the at least one processor derives a low evaluation value when the subject is not captured in the image.

9. The imaging control apparatus according to claim 1, wherein the evaluation value is included in a header information of the multiple data.

* * * * *